US012528149B2

(12) United States Patent
Jin

(10) Patent No.: US 12,528,149 B2
(45) Date of Patent: Jan. 20, 2026

(54) ANGLE GRINDER

(71) Applicant: Wei Jin, Jinhua (CN)

(72) Inventor: Wei Jin, Jinhua (CN)

(*) Notice: Subject to any disclaimer, the term of this patent is extended or adjusted under 35 U.S.C. 154(b) by 369 days.

(21) Appl. No.: 18/155,646

(22) Filed: Jan. 17, 2023

(65) Prior Publication Data

US 2023/0234181 A1 Jul. 27, 2023

(30) Foreign Application Priority Data

Jan. 25, 2022 (CN) ......................... 202210087478.7

(51) Int. Cl.

| | |
|---|---|
| ***B24B 23/02*** | (2006.01) |
| ***B23Q 11/12*** | (2006.01) |
| ***B24B 55/05*** | (2006.01) |
| ***B25F 5/00*** | (2006.01) |
| ***B25F 5/02*** | (2006.01) |

(52) U.S. Cl.

CPC .......... *B24B 23/028* (2013.01); *B23Q 11/127* (2013.01); *B24B 55/052* (2013.01); *B25F 5/008* (2013.01); *B25F 5/02* (2013.01)

(58) Field of Classification Search

CPC ..... B24B 23/028; B24B 23/02; B24B 23/022; B24B 47/12; B24B 41/047; B24B 41/04; B24B 55/00; B24B 55/052; B24B 55/045; B24B 45/00–003; B25F 5/02

USPC ........................................ 451/359, 344, 451

See application file for complete search history.

(56) References Cited

FOREIGN PATENT DOCUMENTS

| | | | | |
|---|---|---|---|---|
| CN | 110370138 A | * | 10/2019 | |
| CN | 110640589 A | * | 1/2020 | ........... B24B 23/028 |
| WO | WO-2021065273 A1 | * | 4/2021 | .............. B25F 5/008 |

OTHER PUBLICATIONS

Machine translation of CN-110370138-A (Year: 2019).*
Machine translation of WO-2021065273-A1 (Year: 2021).*
Machine translation of CN-110640589-A (Year: 2020).*

* cited by examiner

*Primary Examiner* — Robert F Neibaur
(74) *Attorney, Agent, or Firm* — Shumaker, Loop & Kendrick, LLP

(57) ABSTRACT

Disclosed is an angle grinder. An operation body is configured to control the polishing of an action head end, one end of a head housing is detachably connected to the operation body, the other end of the head housing is detachably connected to a front cover. One end of a rotor shaft extends out of the head housing and the front cover; a bearing is sleeved on the periphery of the rotor shaft; the front cover is located on the periphery of the bearing; and an installation stopper can be detachably installed on the rotor shaft and can rotate synchronously with the rotor shaft. One side of the bearing is in contact with the shoulder of the rotor shaft, and the other side of the bearing is contact with the installation stopper. The bearing can be clamped by the installation stopper and the shoulder of the rotor shaft.

9 Claims, 4 Drawing Sheets

ANGLE GRINDER

CROSS-REFERENCE TO RELATED APPLICATION

This patent application claims the benefit and priority of Chinese Patent Application No. 202210087478.7, filed with the China National Intellectual Property Administration on Jan. 25, 2022, the disclosure of which is incorporated by reference herein in its entirety as part of the present application.

TECHNICAL FIELD

The present disclosure relates to the technical field of electric tools, and in particular relates to an angle grinder.

BACKGROUND

As the rotor shaft of the traditional direct-drive angle grinder has a large head near the output end, it is difficult to assemble the rotor assembly. The assembling process is as follows: (1) pressing the rotor shaft into the front cover assembly (with a bearing and a clamp spring inside); (2) press-mounting the rotor end plate and the rotor core on the rotor shaft, respectively; (3) press-mounting the fan blades on the corresponding positions of the rotor shaft; (4) press-mounting the small bearing on the bearing block of the rotor shaft; and (5) installing the assembled front cover and rotor assembly into the head shell together. If there is a quality problem with the front cover or the front cover bearing in such assembled products, the rotor shaft can be pressed out only after the small bearing, fan blades, rotor core, rotor end plate need to be disassembled in sequence, making the whole rotor assembly scrapped. Another defect of the tradition direct-drive angle grinder disassembling structure is that the rotor balance cannot be calibrated, leading to large vibration of the whole machine.

SUMMARY

An objective of the present disclosure is to provide an angle grinder to solve the problems in the prior art. The angle grinder is beneficial for the disassembly and assembly of the cutting and grinding tool and the maintenance of products, and meanwhile, the product quality can be improved, the assembly process of the product is improved, and the after-sales service requirements of customers can be better satisfied.

To achieve the objective above, the present disclosure provides the following technical solutions:

The present disclosure provides an angle grinder. The angle grinder includes an operation body and an action head end connected in sequence. The operation body is configured to control the polishing of the action head end. The action head end includes a brushless motor, a bearing, a cutting and grinding tool, as well as a head housing, a front cover and an installation stopper which are arranged in sequence in an axial direction of a rotor shaft of the brushless motor. One end of the head housing can be detachably connected to the operation body, the other end of the head housing can be detachably connected to the front cover, and the brushless motor is installed in the head housing. One end of the rotor shaft extends out of the head housing and the front cover, the bearing is sleeved on the periphery of the rotor shaft, and the front cover is located on the periphery of the bearing. The installation stopper can be detachably installed on the rotor shaft and can rotate synchronously with the rotor shaft. One side of the bearing is in contact with the shoulder of the rotor shaft, the other side of the bearing is in contact with the installation stopper, and the bearing can be clamped by the installation stopper and the shoulder of the rotor shaft. The installation stopper is configured to install the cutting and grinding tool.

Preferably, the installation stopper includes a distance sleeve and a pressing plate set. The distance sleeve is sleeved on the periphery of the rotor shaft, and the middle part of one end, away from the head housing, of the front cover is provided with an installation hole. The distance sleeve includes an extend-in section and an extend-out section which are fixedly connected in sequence, and the outer diameter of the extend-in section is smaller than that of the extend-out section. The extend-in section is located in the installation hole, the extend-out section is located outside the front cover, and the end, away from the front cover, of the extend-out section is close to the pressing plate set. The pressing plate set can be detachably connected to the rotor shaft, and the pressing plate set is configured to install the cutting and grinding tool.

Preferably, the extend-in section and the extend-out section are coaxially provided.

Preferably, the angle grinder further includes a dustproof cover. The dustproof cover includes an inner wall, a cover plate, and an annular outer wall. The inner wall and the annular outer wall are respectively installed on an inner ring and an outer ring of the cover plate, and the inner wall and the annular outer wall are perpendicular to the cover plate.

An annular groove provided around the dustproof is formed in one side, away from the head housing, of the front cover, and the annular groove is configured to accommodate the annular outer wall. A gap between the inner sidewall of the installation hole and the outer wall of the extend-in section is configured to accommodate the inner wall, and the cover plate can be in contact with the end face, close to the extend-in section, of the extend-out section.

Preferably, the pressing plate set includes an upper pressing plate threaded to the periphery of the rotor shaft and a lower pressing plate sleeved on the periphery of the rotor shaft. The cutting and grinding tool is installed between the upper pressing plate and the lower pressing plate.

Preferably, the extend-out section abuts against the lower pressing plate.

Preferably, the extend-out section is fixedly connected to the lower pressing plate.

Preferably, the angle grinder includes a protective cover. The protective cover can be detachably installed on one side of the installation stopper and is arranged close to the operation body, and the protective cover can cover a part of the periphery of the cutting and grinding tool.

Preferably, the operation body includes a handle, a lithium battery pack, a switch and a heat dissipation mechanism. The lithium battery pack is installed on one side of the handle, the switch is installed on the handle and is configured to control the polishing of the action head end; and the heat dissipation mechanism is used for internal heat dissipation of the action head end.

Preferably, the heat dissipation structure includes an air inlet, an air inlet channel, fan blades, an air outlet, and an air baffle element. The air inlet is formed in the side, away from the action head end, of the handle, and the air outlet is formed in the side of the action head end and communicates with an inner cavity of the action head end. The air baffle element is installed on the action head end, and the air baffle element is located between the air inlet and the air outlet.

The air inlet channel is arranged between the air baffle element and the inner wall of the action head end. The air inlet channel is arranged away from the air outlet, the two ends of the air inlet channel communicate with the air inlet and the inner cavity of the action head end, respectively, and the fan blades are installed around the periphery of the rotor shaft and can rotate along with the rotor shaft.

Compared with the prior art, the present disclosure achieves the following technical effects:

In accordance with the angle grinder provided by the present disclosure, the action head end includes a brushless motor, a bearing, a cutting and grinding tool, as well as a head housing, a front cover and an installation stopper which are arranged in sequence in an axial direction of the rotor shaft of the brushless motor; and the brushless motor is placed in the action head end. Compared with the prior art of placing the motor in the operation body, a gear drive structure is reduced, the structure is simple, and the cost is reduced. The bearing is arranged on the periphery of the rotor shaft, and the bearing is in clearance fit with the rotor shaft. The front cover is located on the periphery of the bearing. Compared with the existing interference fit, the clearance fit facilitates the assembly and disassembly, and then the balance of the brushless motor can be well corrected to reduce the vibration in the working process. Meanwhile, the bearing is clamped through the fitting of the installation stopper and the rotor shaft, thus improving the stability of the overall structure during polishing.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
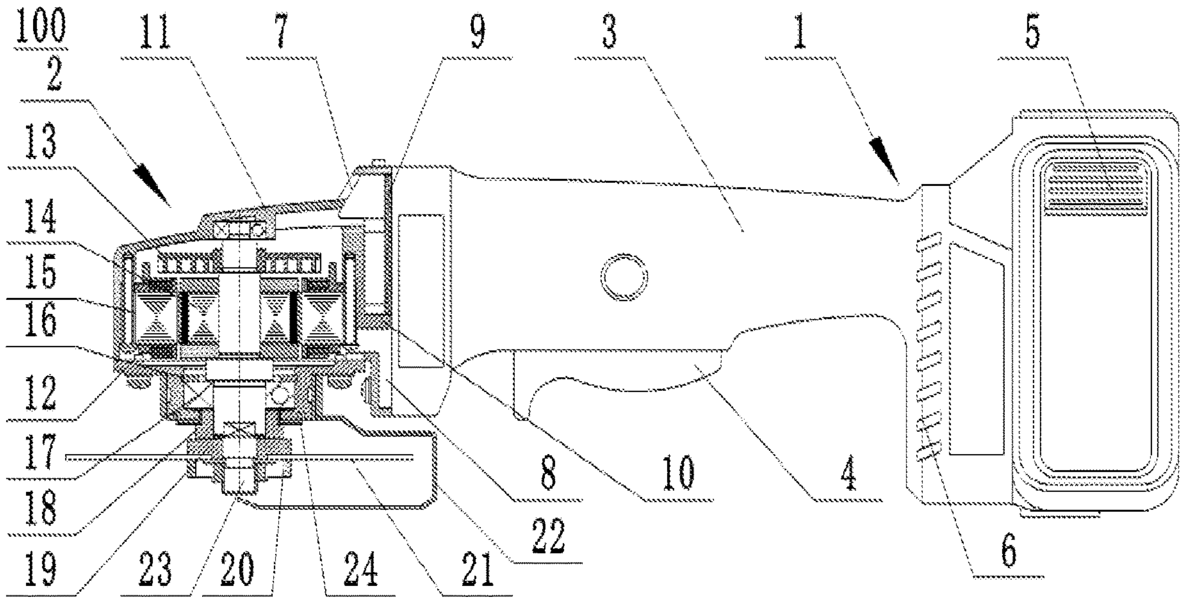
FIG. 1 is a structure diagram of an angle grinder in accordance with the present disclosure.

In the drawings: 100—angle grinder; 1—operation body; 2—action head end; 3—handle; 4—switch; 5—lithium battery pack; 6—air inlet; 7—air outlet; 8—air inlet channel; 9—air baffle plate; 10—air baffle rib; 11—head housing; 12—front cover; 13—fan blade; 14—brushless rotor assembly; 15—brushless stator; 16—snap ring; 17—bearing; 18—distance sleeve; 19—lower pressing plate; 20—upper pressing plate; 21—cutting and grinding tool; 22—protective cover; 23—rotor shaft; 24—dustproof cover; 25—extend-in section; 26—extend-out section; 27—rotor core; 28—magnetic shoe.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an angle grinder to solve the technical problems that the existing angle grinder is complex in structure and inconvenient to assemble and disassemble.

To make the above objective, features and advantages of the present disclosure more apparently and understandably, the following further describes the present disclosure in detail with reference to the accompanying drawings and specific embodiments.

As shown in FIG. 1 to FIG. 5, the present disclosure provides an angle grinder 100. The angle grinder includes an operation body 1 and an action head end 2 which are connected in sequence. The operation body 1 is configured to control the polishing of the action head end 2. The action head end 2 includes a brushless motor, a bearing 17, a cutting and grinding tool 21, as well as a head housing 11, a front cover 12 and an installation stopper which are arranged in sequence in an axial direction of a rotor shaft 23 of the brushless motor. The brushless motor is arranged in the action head end 2, and compared with the prior art of placing the motor in the operation body 1, the gear drive mechanism is reduced, the structure is simple, and the cost is reduced. The brushless motor includes a brushless rotor assembly 14, a brushless stator 15, and a rotor shaft 23. A rotor core 27 and a magnetic shoe 28 are arranged in the brushless rotor assembly. One end of the head housing 11 can be detachably connected to the operation body 1, the other end of the head housing 11 can be detachably connected to the front cover 12, and the brushless motor is installed in the head housing 11. One end of the rotor shaft 23 is rotatably connected to the head housing 11, preferably, the rotatable connection may be achieved by a small bearing, a needle bearing or a copper bushing or the like, and the other end of the rotor shaft 23 extends out of the head housing 11 and the front cover 12. The bearing 17 is sleeved on the periphery of the rotor shaft 23, preferably, the bearing 17 is in clearance fit with the rotor shaft 23, and the front cover 12 is located on the periphery of the bearing 17. Compared with the existing interference fit, the clearance fit facilitates the assembly and disassembly, and then the balance of the brushless motor can be well corrected to reduce the vibration in the working process. An installation stopper can be detachably installed on the rotor shaft 23 and can rotate synchronously along with the rotor shaft 23, one side of the bearing 17 is in contact with the shoulder of the rotor shaft 23, and the other side of the bearing is in contact with the installation stopper. The bearing 17 is clamped through the fitting of the installation stopper and the shoulder of the rotor shaft 23, thus the disassembling is convenient while the connection is stable, and the stability of the whole structure during polishing is achieved. The installation stopper is configured to install the cutting and grinding tool 21, preferably, the cutting and grinding tool 21 may be a cutting disc, an abrasive disc, a buffing wheel, a flap disc, a woodworking saw blade, a felt wheel, a cupped wheel, and the like. However, the specific structure of the cutting and grinding tool 21 in the angle grinder 100 in the present disclosure is not limited to the above, and those skilled in the art may select the right tool according to actual work demands.

Figure 2:
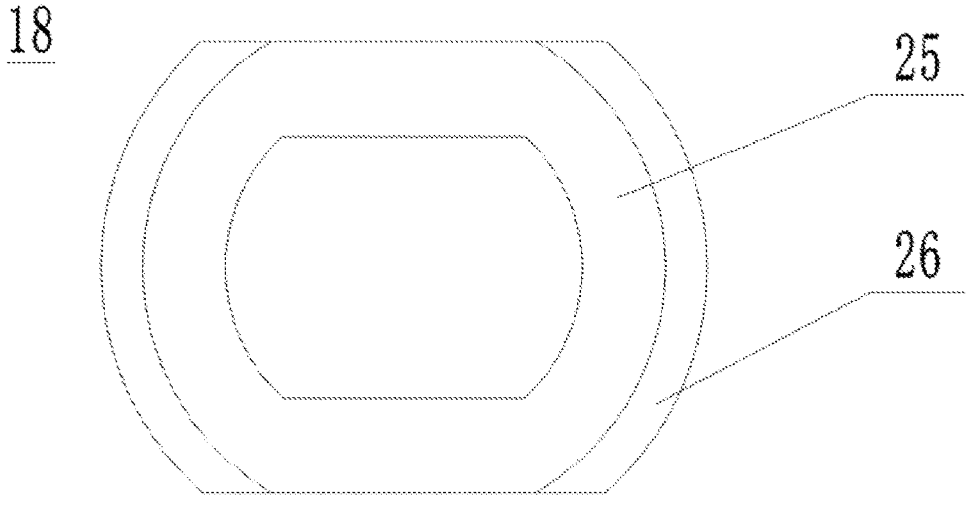
FIG. 2 is a top view of a distance sleeve in an angle grinder in accordance with the present disclosure.
Figure 3:
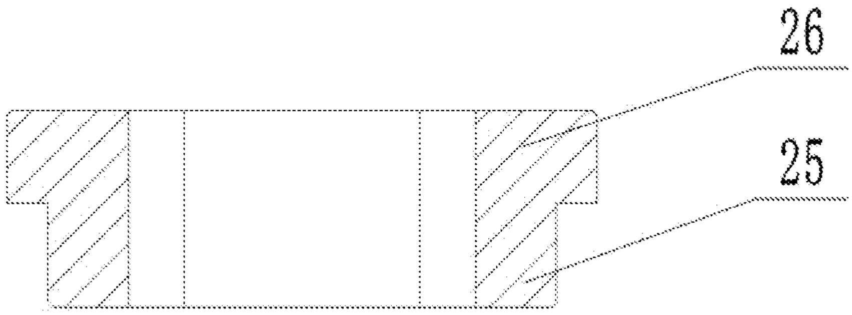
FIG. 3 is a sectional view of FIG. 2.
Figure 4:
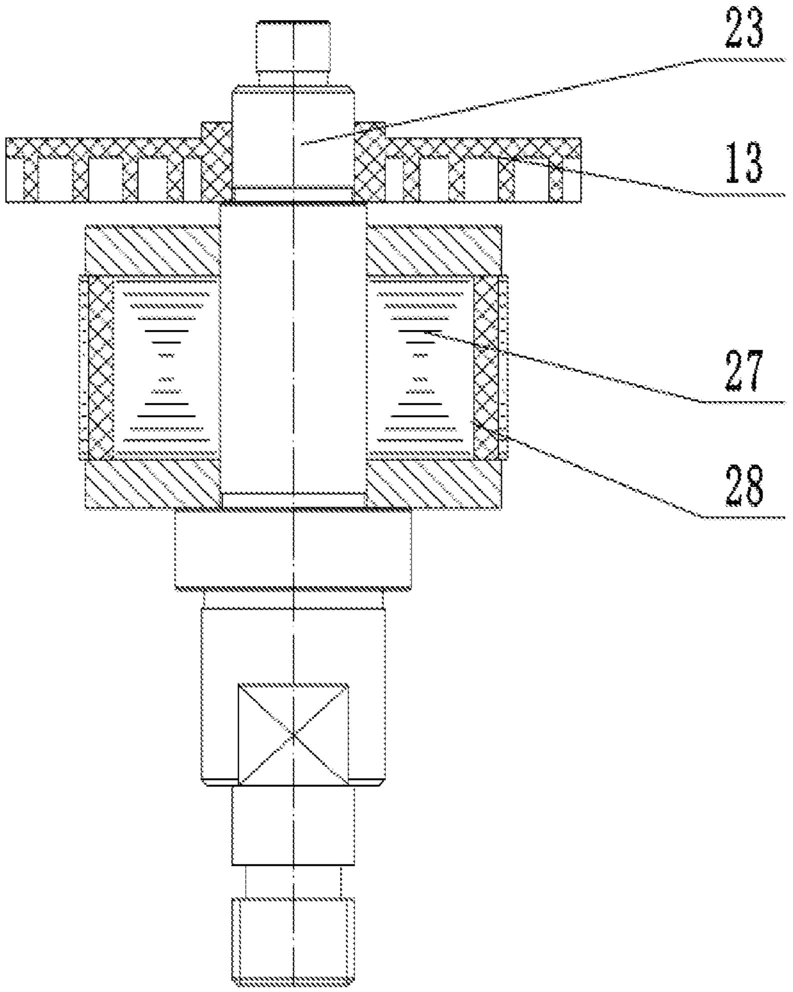
FIG. 4 is a schematic diagram of a rotor shaft in accordance with the present disclosure in fit connection with fan blades.

Specifically, the installation stopper includes a distance sleeve 18 and a pressing plate set. The distance sleeve 18 is sleeved on the periphery of the rotor shaft 23, the middle part of one end, away from the head housing 11, of the front cover 12 is provided with an installation hole for the installing of the distance sleeve 18 and the extend-out of the rotor shaft 23. As shown in FIG. 2 to FIG. 3, the distance sleeve 18 includes an extend-in section 25 and an extend-out section 26 which are fixedly connected in sequence, the outer diameter of the extend-in section 25 is smaller than that of the extend-out section 26, and the extend-in section 25 and the extend-out section 26 are coaxially arranged, i.e., the extend-in section 25 forms a limiting step with the outer wall of the extend-out section 26. The end face, close to the extend-in section 25, of the extend-out section 26 forms a step surface, the extend-in section is located in the installation hole, and the extend-out section 26 is located outside the front cover 12 so as to achieve the limiting of a dustproof cover 24. Preferably, the extend-in section 25 and the extend-out section 26 are hollow, and the hollow shapes are oblate shapes which correspond to the shape of the rotor shape and are in fit connection. The outer circle of the extend-out section 26 is provided with an oblate shape, which enables the distance sleeve 18 to be in fit with an open-end wrench and an external wrench to facilitate the assembly and disassembly, thereby facilitating the replacement of the cutting and grinding tool 21, and improving the disassembly and assembly efficiency. The end, away from the front cover 12, of the extend-out section 26 is close to the pressing plate set, the pressing plate set can be detachably connected to the rotor shaft 23 to facilitate the assembly and disassembly, and the pressing plate set is configured to install the cutting and grinding tool 21. Preferably, the inner wall of the front cover 12 is further provided with a snap ring hole for installing a snap ring 16, the inner wall of the snap ring 16 extends out of the snap ring hole, and the lower end face of the snap ring 16 can abut against the upper end face of the bearing 17.

The angle grinder 100 provided by the present disclosure further includes a dustproof cover 24. The dustproof cover 24 includes an inner wall, a cover plate, and an annular outer wall. The inner wall and the annular outer wall are respectively installed on an inner ring and an outer ring of the cover plate, and the inner wall and the annular outer wall are both perpendicular to the cover plate. The side, away from the head housing 11, of the front cover 12 is provided with an annular groove arranged around the dustproof cover 24. The annular groove is configured to accommodate the annular outer wall, a gap between the inner sidewall of the installation hole and the outer wall of the extend-in section 25 is configured to accommodate the inner wall. The cover plate may be in contact with the step surface to make the connection stable. Through the cooperation of the front cover 12 and the dustproof cover 24, the dust generated in the polishing process is prevented from entering the head housing 11 and the front cover 12 to affect the whole service life.

The pressing plate set includes an upper pressing plate 20 threaded to the periphery of the rotor shaft 23 and a lower pressing plate 19 sleeved on the periphery of the rotor shaft 23. The threaded connection facilitates the assembly and disassembly while guaranteeing the connection stability. When the front cover 12 or the bearing 17 is damaged, it is unnecessary to disassemble the whole brushless motor, the cost is reduced, and the after-sale maintenance difficulty is also reduced. The lower pressing plate 19 is a structure with a wide upper part and a narrow lower part, and the cutting and grinding tool 21 is sleeved outside the narrow section of the lower pressing plate 19, and the cutting and grinding tool 21 can be tightly pressed through the cooperation of the upper pressing plate 20 and the lower pressing plate 19, thus achieving the fixation of the cutting and grinding tool 21.

As an embodiment, the extend-out section 26 abuts against the lower pressing plate 19 to facilitate the disassembly. However, the connection mode of the extend-out section 26 and the lower pressing plate 19 is not limited to the abutment. In the actual production process, the extend-out section 26 may be fixedly connected to the lower pressing plate 19, i.e., the distance sleeve 18 and the lower pressing plate 19 are a single integrated component.

The angle grinder 100 provided by the present disclosure also includes a protective cover 22, which can be detachably installed on the side where the installation stopper is located, and is arranged close to the operation body 1. The protective cover 22 can cover a part of the periphery of the cutting and grinding tool 21, i.e., a part of the cutting and grinding tool 21 can rotate to an area enclosed by the protective cover 22, and then the part, close to a handholding end, of the cutting and grinding tool 21 can be shielded by the protective cover 22 to avoid safety accidents.

The operation body 1 includes a handle 3, a lithium battery pack 5, a switch 4, and a heat dissipation mechanism. The lithium battery pack 5 is installed on one side of the handle 3 for power supply. The switch 4 is installed on the handle 3 and is configured to control the polishing of the action head end 2, thus performing opening/closing action according to actual demands. The heat dissipation mechanism is used for internal heat dissipation of the action head end 2 and the heat dissipation of the controller, thus preventing the parts from being damaged due to overheat.

Figure 5:
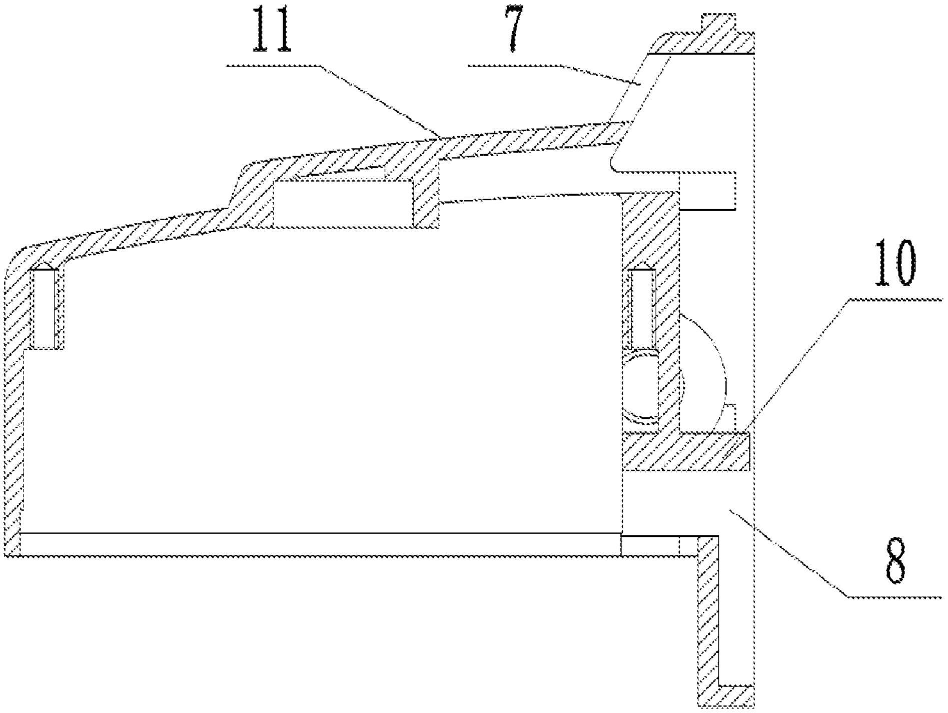
FIG. 5 is a schematic diagram of a head housing in accordance with the present disclosure in fit connection with an air baffle rib.

As shown in FIG. 1 and FIG. 5, the heat dissipation structure includes an air inlet 6, fan blades 13, an air inlet channel 8, an air outlet 7, and an air baffle element. The air inlet 6 is formed in the side, away from the action head end 2, of the handle 3, and the air outlet 7 is formed in the side of the action head end 2 and communicates with an inner cavity of the action head end 2. The air baffle element is installed on the action head end 2, and the air baffle element is located between the air inlet 6 and the air outlet 7, so that the external air enters the inner cavity of the operation body 1 from the air inlet 6, is guided by the air inlet channel 8 of the head housing 11 after bypassing the air baffle element, then passes through the fan blades 13, and is finally discharged from the air outlet 7. The heat dissipation effect is improved, and the situation that the air entering from the air inlet 6 is directly discharged from the air outlet 7 without passing through the brushless motor and other elements is avoided. The air inlet channel 8 is provided between the air baffle element and the inner wall of the action head end 2, the air inlet channel 8 is arranged away from the air inlet 7, and the air is guided to the brushless motor through the guidance of the air inlet channel 8. Both ends of the air inlet channel 8 respectively communicate with the air inlet 6 and the inner cavity of the action head end 2. The fan blades 13 are installed around the periphery of the rotor shaft 23 and can rotate with the rotor shaft 23, thus achieving cooling. Preferably, the air baffle element includes an air baffle plate 9 and an air baffle rib 10. The air baffle plate 9 is parallel to the rotor shaft 23, the upper end of the air baffle plate 9 is fixed to the inner top surface of the head housing 11, and the lower end of the air baffle plate 9 extends downward but does not make contact with the inner bottom surface of the head housing 11. The air baffle rib 10 is tightly connected to the air baffle plate 9, and the air inlet channel 8 is formed between the air baffle rib 10 and the inner wall of the head housing 11. A controller is further arranged at the air inlet 6 to facilitate the heat dissipation of the controller.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An angle grinder, comprising an operation body and an action head end connected in sequence, wherein the operation body is configured to control the polishing of the action head end; the action head end comprises a head housing, a brushless motor, a bearing, a front cover, an installation stopper and a cutting and grinding tool, which are arranged in sequence in an axial direction of a rotor shaft of the brushless motor; one end of the head housing is detachably connected to the operation body, the other end of the head housing is detachably connected to the front cover, and the brushless motor is installed in the head housing; one end of the rotor shaft extends out of the head housing and the front cover, the bearing is sleeved on the periphery of the rotor shaft, and the front cover is located on the periphery of the bearing; the installation stopper is detachably installed on the rotor shaft and rotates synchronously with the rotor shaft; one side of the bearing is in contact with a shoulder of the rotor shaft, the other side of the bearing is in contact with the installation stopper, and the bearing is clamped by the installation stopper and the shoulder of the rotor shaft; and the installation stopper is configured to install the cutting and grinding tool;

wherein the operation body comprises a handle, a lithium battery pack, a switch and a heat dissipation mechanism; the lithium battery pack is installed on one side of the handle, the switch is installed on the handle and is configured to control the polishing of the action head end; and the heat dissipation mechanism is used for internal heat dissipation of the action head end.

2. The angle grinder according to claim 1, wherein the installation stopper comprises a distance sleeve and a pressing plate set; the distance sleeve is sleeved on the periphery of the rotor shaft; a middle part of one end, away from the head housing, of the front cover is provided with an installation hole; the distance sleeve comprises an extend-in section and an extend-out section which are fixedly connected in sequence; an outer diameter of the extend-in section is smaller than an outer diameter of the extend-out section; the extend-in section is located in the installation hole, the extend-out section is located outside the front cover, and the end, away from the front cover, of the extend-out section abuts against the pressing plate set; and the pressing plate set is detachably connected to the rotor shaft, and the pressing plate set is configured to install the cutting and grinding tool.

3. The angle grinder according to claim 2, wherein the extend-in section and the extend-out section are coaxially provided.

4. The angle grinder according to claim 2, further comprising a dustproof cover, wherein the dustproof cover comprises an inner wall, a cover plate and an annular outer wall; the inner wall and the annular outer wall are respectively installed on an inner ring and an outer ring of the cover plate, and the inner wall and the annular outer wall are both perpendicular to the cover plate;

an annular groove provided around the dustproof cover is formed in one side, away from the head housing, of the front cover, and the annular groove is configured to accommodate the annular outer wall; a gap between the inner sidewall of the installation hole and the outer wall of the extend-in section is configured to accommodate the inner wall, and the cover plate is in contact with an end face, closest to the extend-in section, of the extend-out section.

5. The angle grinder according to claim 2, wherein the pressing plate set comprises an upper pressing plate threaded to the periphery of the rotor shaft and a lower pressing plate sleeved on the periphery of the rotor shaft; and the cutting and grinding tool is installed between the upper pressing plate and the lower pressing plate.

6. The angle grinder according to claim 5, wherein the extend-out section abuts against the lower pressing plate.

7. The angle grinder according to claim 5, wherein the extend-out section is fixedly connected to the lower pressing plate.

8. The angle grinder according to claim 1, further comprising a protective cover, wherein the protective cover is detachably installed on one side of the installation stopper, and the protective cover is able to cover a part of the periphery of the cutting and grinding tool.

9. The angle grinder according to claim 1, wherein the heat dissipation mechanism comprises an air inlet, an air inlet channel, fan blades, an air outlet, and an air baffle element; the air inlet is formed in the side, away from the action head end, of the handle, the air outlet is formed in the side of the action head end and communicates with an inner cavity of the action head end; the air baffle element is installed on the action head end, and the air baffle element is located between the air inlet and the air outlet; the air inlet channel is arranged between the air baffle element and the inner wall of the action head end; the air inlet channel is arranged away from the air outlet, the two ends of the air inlet channel communicate with the air inlet and the inner cavity of the action head end, respectively, and the fan blades are installed around the periphery of the rotor shaft, and are able to rotate along with the rotor shaft.

* * * * *